Nov. 29, 1966 D. W. MOLINS ETAL 3,288,147

TOBACCO-MANIPULATING MACHINES

Original Filed May 31, 1960 9 Sheets-Sheet 1

INVENTORS
Desmond W. Molins
Gordon F. W. Powell
Frederick Pocock
BY
Watson, Cole, Grindle & Watson
ATTORNEYS Nov. 29, 1966 D. W. MOLINS ETAL 3,288,147

TOBACCO-MANIPULATING MACHINES

Original Filed May 31, 1960 9 Sheets-Sheet 2

INVENTORS
Desmond W. Molins
Gordon F. W. Powell
Frederick Pocock
BY
Watson, Cole, Grindle & Watson
ATTORNEYS Nov. 29, 1966 D. W. MOLINS ET AL 3,288,147

TOBACCO-MANIPULATING MACHINES

Original Filed May 31, 1960 9 Sheets-Sheet 3

Desmond W. Molins
Gordon F. W. Powell
Frederick Pocock
INVENTORS
BY
Watson, Cole, Grindle & Watson
ATTORNEYS INVENTORS
Desmond W. Molins
Gordon F. W. Powell
Frederick Pocock
BY
Watson, Cole, Grindle & Watson
ATTORNEYS INVENTORS
Desmond W. Molins
Gordon F. W. Powell
Frederick Pocock
BY
Watson, Cole, Grindle & Watson
ATTORNEYS INVENTORS
Desmond W. Molins
Gordon F. W. Powell
Frederick Pocock
BY
Watson, Cole, Grindle & Watson
ATTORNEYS Nov. 29, 1966 D. W. MOLINS ET AL 3,288,147

TOBACCO-MANIPULATING MACHINES

Original Filed May 31, 1960 9 Sheets-Sheet 7

Desmond W. Molins
Gordon F. W. Powell
Frederick Pocock
INVENTORS

BY

Watson, Cole, Grindle & Watson
ATTORNEYS

TOBACCO-MANIPULATING MACHINES

Original Filed May 31, 1960 9 Sheets-Sheet 8

INVENTOR
Desmond Walter Molins, et al
BY
Watson, Cole, Grindle & Watson
ATTORNEY INVENTOR
Desmond Walter Molins, et al
BY
Watson, Cole, Grindle & Watson
ATTORNEY 3,288,147
Patented Nov. 29, 1966

3,288,147

TOBACCO-MANIPULATING MACHINES

Desmond Walter Molins, Gordon Francis Wellington Powell, and Frederick Pocock, all of Deptford, London, England, assignors to Molins Machine Company Limited, London, England, a British company Continuation of application Ser. No. 32,959, May 31, 1960. This application May 1, 1964, Ser. No. 373,595
Claims priority, application Great Britain, June 3, 1959, 19,063/59
4 Claims. (Cl. 131—21)

This application is a continuation of patent application Serial No. 32,959, filed May 31, 1960, now abandoned.

This invention relates to continuous rod cigarette-making machines, that is, machines in which cigarettes are made by forming a continuous tobacco filler stream, wrapping and sealing a continuous wrapper about the filler stream to form a continuous cigarette rod and severing the rod into equal lengths to form cigarettes. The continuous wrapper is generally made of paper.

More particularly the invention relates to the control of the weight of the cigarettes.

It is desirable for many reasons, such as economy in the quantity of tobacco consumed by the machines, and for the production of cigarettes of uniform quality, that the cigarettes produced by such a machine should be all of substantially the same weight. Clearly this can be achieved if the continuous tobacco filler stream, and thus the continuous cigarette rod is of uniform mass per unit length. The term "filler stream" is consistently used herein to designate the elongated, narrow, ropelike stream commonly formed by showering tobacco onto an endless conveyor by which the stream is forwarded toward conventional cigarette rod-forming mechanism.

A continuous tobacco filler stream which is not of uniform mass per unit length can be made uniform by a trimming operation which removes surplus tobacco from the stream. In order to make the individual cigarettes as near in weight to each other as possible it is necessary to carry out the trimming operation on the stream downstream of the position at which the extent of the lack of uniformity of the stream has been detected. A trimming operation which is carried out upstream of the position where the extent of lack of uniformity of the stream has been detected will result merely in modification of succeeding lengths of the tobacco stream.

In order to control the trimming operation effectively knowledge of the variations of density of the stream is required as the stream can then be trimmed in a manner to vary its cross-sectional area so as to compensate for the density variations.

It is not practicable to measure directly the variations in density of the tobacco filler stream so the density must therefore be deduced from some other characteristic of the stream.

Clearly there is a relationship between the air permeability of the tobacco filler stream and the density of the stream as a more dense stream will clearly be less air permeable than a less dense stream. The air permeability of the tobacco stream can be indicated by the pressure drop the tobacco stream produces on air flowing through it.

The variations of the air permeability of the tobacco filler stream are not a completely reliable guide to the variations of density of the stream as the air permeability is affected by other variables. A measure of the reliability of the air permeability of the tobacco filler stream in indicating the density of the stream is the degree of correlation between the air permeability and the density.

That two variables can be correlated, that is, that there is a recognizable relation between the two in that there is a general tendency for one to vary if the other varies, although not an exact functional relationship, is well-recognized in the science of statistics as a correlation and the degree of correlation between two variables can be expressed by the statistical function known as the correlation coefficient.

The correlation coefficient is dimensionless, as its name implies, and may be expressed as:

$$r=\frac{\Sigma(x-\bar{x})\,(y-\bar{y})}{\sqrt{\Sigma(x-\bar{x})^2\times\Sigma(y-\bar{y})^2}}$$

where $x$ represents instantaneous values of one variable
$y$ represents instantaneous values of the other variable
$\bar{x}$ is the arithmetic mean of the $x$ values
$\bar{y}$ is the arithmetic mean of the $y$ values and
$\Sigma$ is used in its normal mathematical sense as indicating that the sum of all such terms should be taken.

The correlation coefficient is discussed in the following publications: "Facts From Figures" by M. J. Moroney (Penguin Books, Inc.), particularly page 286, and "Statistical Methods in Research and Production" by Owen L. Davies (Oliver and Boyd, London), particularly paragraph 7.92.

Due to the form of the expression for the correlation coefficient given above this coefficient can have values only between +1 and −1. These limiting values are obtained only if there is complete correlation between the two variables, in other words, that an exact functional relationship connects the two. The negative sign indicates that the correlation is in the inverse sense.

A relationship may be adduced between the air permeability and the trimming operation which is carried out on the filler stream in accordance with variations in the detected values of the air permeability. This relationship will herein be termed the "Coupling factor" ($k$). Thus a coupling factor of unity ($k=1$) indicates that the correction actually made on the filler stream is the full correction indicated by the measurement of air permeability as necessary to the production of a filler of uniform mass per unit length.

Whatever the means employed to detect variations in the air permeability of the tobacco filler stream, the information derived from such means is described herein as a "signal." This meaning is in accord with the definition given in the New Century Dictionary "something . . . as . . . light, sound . . . used to give warning, indication, direction, etc." In the preferred embodiment of the invention the medium is air and the information is given as variations in flow of air, and as variations in air pressure derived therefrom. In order to define this coupling factor the following terms will be used. "A" which is the constant cross-sectional area to which the filler stream would be trimmed if there were no variations in density, "$A_1$" which is the cross-sectional area to which the filler stream would be trimmed at any instant if the variations in air permeability reliably indicated the variations in density of the stream, and "$A_2$" which is the cross-sectional area to which the stream is actually trimmed at that instant.

This coupling factor is dimensionless and is the ratio of the difference between A and $A_2$ to the difference between A and $A_1$. Thus $k=1$ when $A_2$ is made equal to $A_1$ i.e. when the cross-sectional area to which the tobacco filler stream is actually trimmed is the cross-sectional area to which the air-permeability indicates it ought to be trimmed. Thus, also, $k=0.5$ when $A_2$ is made such that the difference between $A_2$ and A is half the difference between $A_1$ and A. The selected coupling factor $k$ is established by the design and initial adjustment of the trimming apparatus.

However, although the air permeability may not be completely reliable as a guide to instantaneous or short-term variations of the density it can be a more or less completely reliable guide to long-term or persisting variations of the density because if the signal from apparatus which is sensing the air permeability is integrated or smoothed, the instantaneous and not completely reliable values will be submerged in the smoothed signal. In this specification the term "smoothed" in relation to a signal is intended to mean that the signal has had its short-term variations reduced or removed so that the smoothed signal contains substantially only long-term variations.

As air permeability is not fully reliable as a guide to the variations of the density then better results as regards uniformity of weight of cigarettes produced by a machine are obtained if the changes in cross sectional area made to the filler stream by the trimming operation (i.e. the difference between A and $A_2$) are made to be smaller than if an exact functional relationship existed between the air permeability and the density. This means that the coupling factor should be made less than 1. However, although appropriate choice of the coupling factor will give the best results for the uniformity of weights of individual cigarettes it does mean that so far as the mean weight of the tobacco stream and therefore the mean weight of the cigarettes the best results are not being achieved.

It is an object of the present invention to make use of a signal from apparatus sensing air permeability of a continuous tobacco filler stream to control a trimming operation to achieve the best results with regard to long-term variations of the filler stream, and thereby to obtain the best mean weight of the cigarettes i.e. the average weight of batches of successive cigarettes and also at the same time to provide a correcting action for short-term variations to improve the uniformity of weights of individual cigarettes.

To achieve this object, trimming means are located to trim the continuous tobacco filler stream downstream of the means sensing the air permeability and producing the signal and the trimming means is controlled both by apparatus which responds to the signal itself and by apparatus which responds to the smoothed signal. The effects of the short term and the long term responsive apparatus in controlling the trimming apparatus are added and the coupling factor $k_2$ between the smoothed signal and the trimming action made in response to the smoothed signal is made equal to $1-k_1$ where $k_1$ is the coupling factor between the signal itself and the trimming action made in response thereto, i.e., the correction for short-term variations.

The apparatus which responds to the signal itself is called herein a "proportional control" as it responds in a manner proportional to the signal, or as a "first control means."

The apparatus which responds to the smoothed signal is called herein an "integral control" as it responds in a manner proportional to the time integral of the signal, or as a "second control means." The time constant for the integral control may be for example the time the continuous rod cigarette making machine takes to make 100 cigarettes that is 5 seconds for a machine operating at 1200 cigarettes per minute.

In practice the proportional control will also have a small but unavoidable time constant. This is made as small as possible, say 50 milliseconds.

Since the signal provided by the air permeability sensing apparatus reflects both the short-term and long-term variations in air permeability, it can be considered a "composite signal," although it will be appreciated that only the one signal is generated.

Another object of the invention is to use the signal from the apparatus sensing the air permeability to control the trimming operation on the filler stream to make the best correction for short term variations of mass per unit length and thus to obtain the best degree of uniformity of individual cigarette weights.

To achieve this object the coupling factor $k_1$ as defined above is made equal to $$\frac{r}{\sqrt{2-r^2}}$$

where $r$ is the correlation coefficient as defined above between the signal itself (and therefore the air permeability) and the density.

In this specification so far, emphasis has been laid on the desirability of the cigarettes being of substantially the same weight by ensuring that the tobacco filler has a substantially uniform mass per unit length. However, a factor of comparable importance to the smoker is the "draw" of the cigarette, i.e. how hard he has to draw on the cigarette to smoke it; in other words, the resistance of the cigarette to a flow of air therethrough, and whether the draw is reasonably uniform between different cigarettes.

It is easily appreciated that, for a given size of cigarette the draw is related to the mass, nature and condition of the tobacco contained therein. Considering mass only (since one may assume that the nature and condition of the tobacco in successive cigarettes will be reasonably uniform), it will be harder to draw on a tightly packed cigarette than on a loosely packed one, which, other things being equal, will contain less tobacco and therefore will be lighter. It can therefore be seen that uniformity of cigarette weights about a correct mean will tend to give correct and uniform draw to the cigarettes.

Apparatus in accordance with the invention will now be described by way of example with reference to the accompanying drawings, in which.

Figure 1:
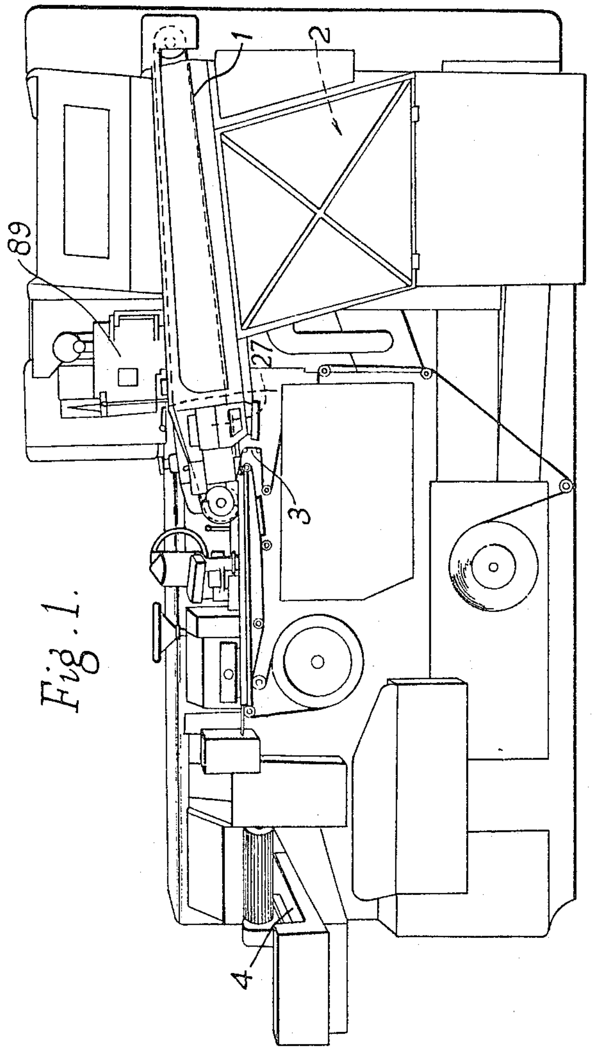
FIGURE 1 is a front elevation of a continuous rod cigarette-making machine in accordance with the invention.
Figures 2, 3:
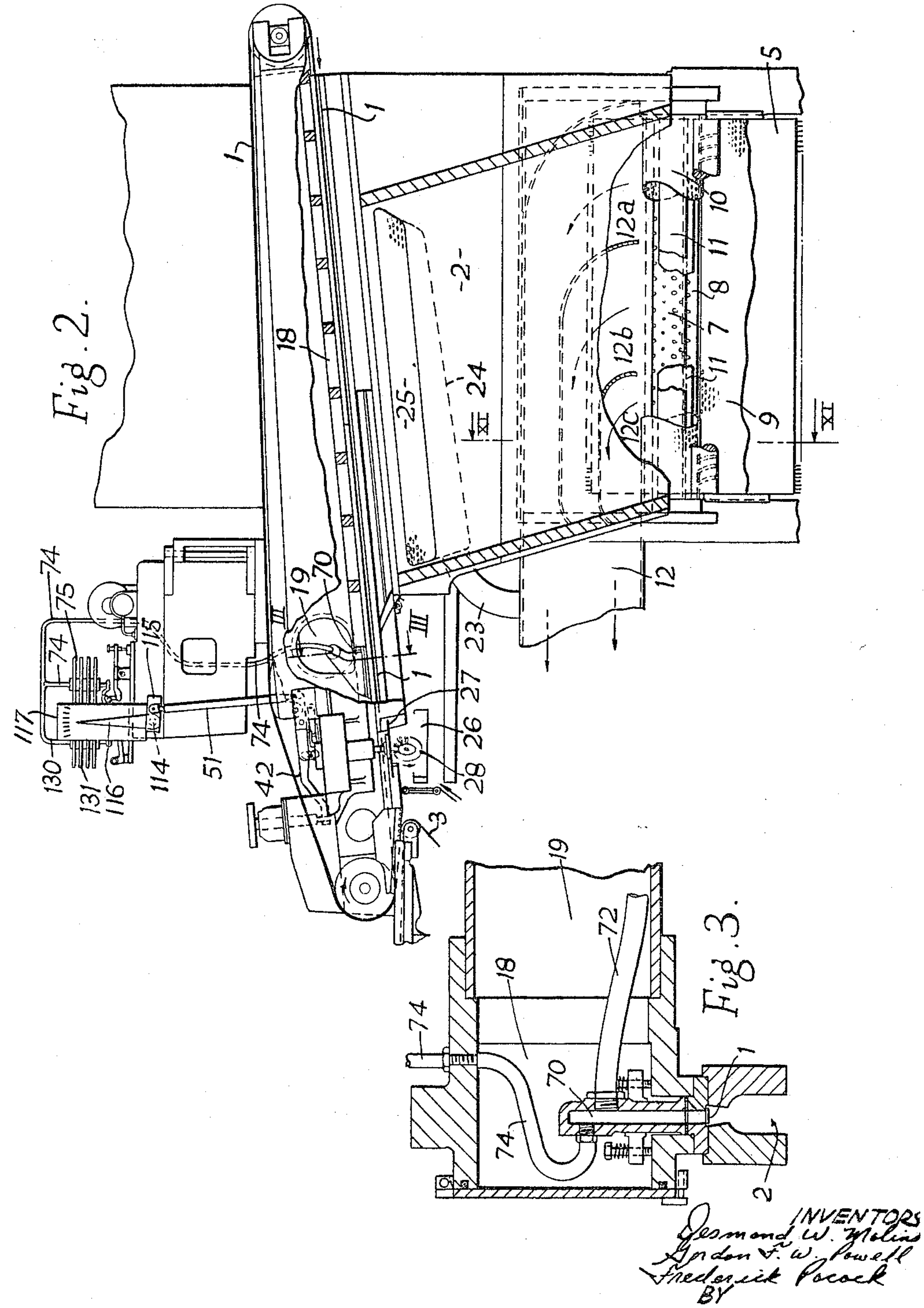
FIGURE 2 is a front elevation to a larger scale, with parts broken away, of the right-hand part of the machine shown in FIGURE 1.
FIGURE 3 is a section taken on the line III—III, FIGURE 2, to a larger scale.
Figure 8:
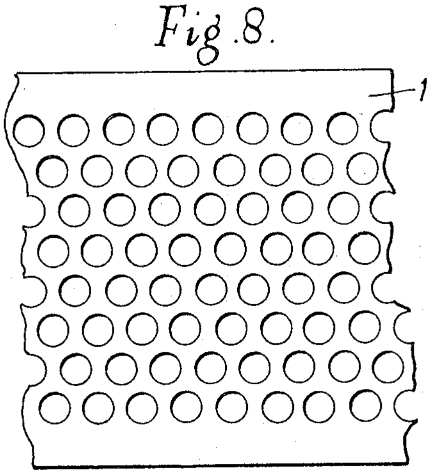
FIGURE 8 shows, to a greatly enlarged scale, a fragment of a perforated air-pervious conveyor band.

In the machine illustrated in FIGURE 1, cut tobacco is fed by a current of air to a perforated metal conveyor band 1 (a fragment of which, greatly enlarged, is shown in FIGURE 8) which runs through the upper part of a narrow passage 2 through which the air flows upwardly, as also shown in FIGURE 2. The tobacco so fed is suctionally held on the underside of the conveyor band 1, on which the tobacco builds up to form a continuous tobacco stream or filler which is carried by the band from right to left as viewed in FIGURE 1. Beyond the illustrated left end of the passage 2, the tobacco stream or filler is subjected to a trimming operation to remove surplus tobacco and thereby reduce variations in the uniformity of the mass per unit length of the stream or filler, and this operation may be said to result in the production of a continuous trimmed filler. This filler is transferred from the conveyor band 1 on to a continuous paper web 3, and after the filler has passed beneath a compression tongue, the paper is folded and secured around it to form a continuous cigarette rod. This rod is severed at appropriate intervals, by a suitable cut-off mechanism, to form individual cigarettes, which are deflected on to a cather band 4. These rod forming and cutting devices are orthodox and need no detailed description.

FIGURE 2 shows in more detail the arrangements for feeding tobacco to the conveyor band 1. The tobacco is fed, for example in the manner disclosed in the specification and drawings of U.S. Patent No. 3,062,357, issued November 6, 1962, on to the upper surface as a carded drum 5, which carries it past a brushing roller (FIGURE 11) and from which it is picked and thrown forwardly by a picker roller 7 which impels the tobacco over a guide plate 8 towards the entrance to the passage 2. Air is caused to flow upwardly through a grille 9 into the passage 2, and also through a perforated rotating cylinder 10 which rotates past fixed elements 11, the cylinder 10 and elements 11 being shown broken away. Air is drawn through the rotating cylinder 10 into and through a duct 12, which adjacent the cylinder is divided into three sections **12*a*, 12*b* and 12*c***, as shown also in FIGURE 11.

Air is drawn through the cylinder 10 and duct 12 by a suction fan (not shown) and is discharged into a diffuser chamber (not shown) from which it flows upwardly through the grille 9.

A further suction fan (not shown) draws air through the passage 2, and a suction chamber 18, and discharges it to atmosphere through a multi-unit cyclone (not shown) by which dust is separated from the air, which latter is discharged to atmosphere.

A pipe 23 connects the passage 2 with the conduit 12 through a suction chamber 24 and a grille 25 in the passage 2, so that some of the air flowing through the passage is drawn off before reaching the conveyor band 1. This arrangement is as disclosed in the specification and drawings of U.S. Patent No. 3,019,793, issued February 6, 1962, and is for the purpose of increasing the velocity of the air stream in the passage.

By the arrangement described above, tobacco impelled by the picker roller 7 is caused, by the air flowing into and through the perforated cylinder 10, to move through a generally arcuate path into the passage 2. The arrangements for thus changing the direction of the tobacco are more fully described in U.S. Patent No. 3,030,965, issued April 24, 1962. The air stream which flows up through the passage 2 has a high velocity, and accelerates and generally ensures separation of the particles of tobacco which are fed into the passage, so that this tobacco reaches the conveyor band 1 substantially in the form of separated particles, as also described in the patent just mentioned.

Tobacco is fed to the conveyor band 1 in such a quantity as to form a filler having an excess of tobacco, which excess is removed by the trimming operation mentioned above. The filler as originally formed contains varying quantities of excess tobacco along its length, and the purpose of the trimming operation is to reduce these inequalities while reducing the cross-sectional size of the filler.

Figure 4:
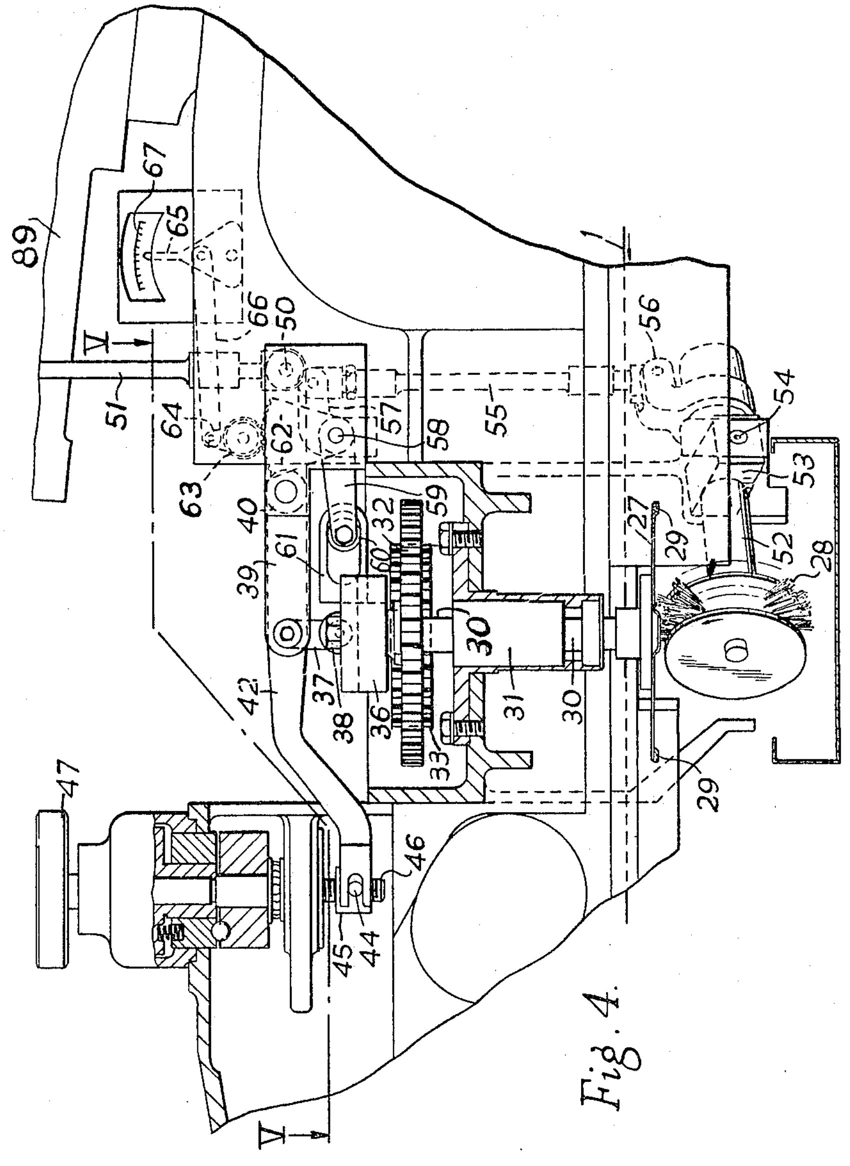
FIGURE 4 is an enlarged view of a part of the machine shown in FIGURE 2, partly in section and illustrating the trimming device and its mounting shown therein.

Referring particularly to FIGURES 2 and 4, a trimming device, generally indicated by the reference numeral 26, and which performs the trimming operation mentioned above, comprises a pair of rotating discs 27 mounted adjustably at a suitable level beneath that of the conveyor band 1. A brush 28 is mounted for rotation beneath the discs 27 and assists in the trimming operation by helping to separate tobacco which is below the level of the discs from that which is above that level.

Figure 6:
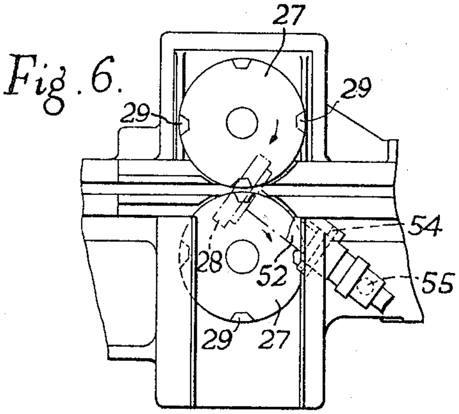
FIGURE 6 is an underneath plan view of part of the mechanism shown in FIGURE 4.

As shown in FIGURES 4 and 6, each of the discs 27 is provided at its edge with four equi-spaced, downwardly recessed portions 29. When on rotation of the discs a pair of these recessed portions meet as shown in FIGURE 6, less tobacco is removed from that part of the filler in which they engage than is removed from those parts engaged by the plain portions of the disc edges. This results in the trimmed filler having more tobacco at definite spaced positions than elsewhere, in order that when the filler is compressed to rod size, those portions through which the rod is cut to cigarette lengths will contain denser tobacco than intermediate portions, and the cigarettes produced will have "dense ends."

The discs 27 are fixed on the ends of vertical spindles 30 which are slidable up and down, and also rotatable, in bearings in sleeves 31, FIGURE 4. Near the upper ends of the spindles 30 are fixed a pair of gear wheels 32, FIGURES 4 and 5, one of which is driven by a gear wheel 33, FIGURE 5. The gear wheel 33, which is rotated by means of a belt 34 driving a pulley 35 fixed to the gear wheel 33, is a little thicker than the gear wheel 32 which it drives, so as to permit up and down movement of the latter gear wheel.

The upper ends of the spindles 30 are rotatably supported in bearings in opposite ends of a yoke 36 (FIGURES 4 and 5) which therefore supports the discs 27. The yoke 36 is supported by a link 37 pivoted at one end to a lug 38 on the yoke, and pivoted at its other end to the free end of lever 39. The opposite end of lever 39 is secured to a rotatable sleeve 40 from which extends another lever 41. The free end of the lever 41 is pivotally connected to a long lever 42, approximately midway along the length of the latter, by a pin 43.

Figure 5:
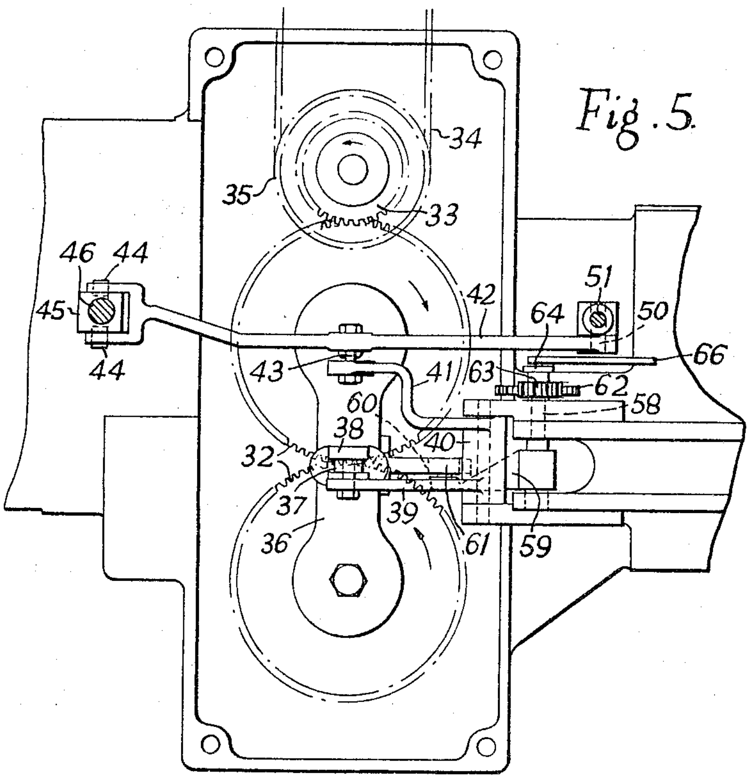
FIGURE 5 is a section on line V—V of FIGURE 4.

The left-hand end of the lever 42, as viewed in FIGURES 4 and 5, is forked, the ends of the fork being slotted to receive projections 44 extending from a block 45. The block has a threaded aperture to receive a screw 46, which is rotatable to raise or lower the end of the lever 42.

The other end of the lever 42 is pivoted at 50 on the lowermost end of a downwardly extending rod 51. This rod is arranged to be moved lengthwise up and down in a manner shortly to be described.

Thus, the position of the discs 27, that is, their distance from the conveyor band 1, is controlled by the rod 51.

The brush 28 is mounted on a shaft 52, FIGURES 4 and 6, and is rotated by a pulley and belt drive, not shown. Arrangements are provided for raising and lowering the brush together with the discs 27. For this purpose the shaft 52 is journalled in a block 53 pivoted at 54 and arranged to be swung about its pivot by a rod 55 pivoted on an extension 56. The rod 55 is moved up and down by a lever 57 fixed on a rock-shaft 58 on which is fixed a lever 59. A roller 60 on the free end of the lever 59 is accommodated in a slot in an extension 61 fixed to the yoke 36. Thus, the up and down movements of the yoke 36, which raise and lower the discs 27, also effect a corresponding raising and lowering of the brush 28 through the linkage just described.

Also fixed on the shaft 58 is an arcuate rack 62, whose teeth mesh with a pinion 63. A short lever 64 fixed to the pinion 63 transmits swinging motion to a pivoted indicator needle 65 through a link 66. The needle 65 moves over a scale 67 suitably calibrated, and gives a visual indication of the position of the trimming discs 27 at any instant, and at the extent to which they move up or down.

Referring now to FIGURES 2 and 3, a short distance beyond the passage 2, but upstream of the trimming device 26 (that is, to the right of the trimming device as viewed in FIGURE 2), a small chamber or air cell 70 is located inside the suction chamber 18. As best seen in FIGURE 3, this chamber 70 has an opening adjacent the perforated conveyor band 1. The width of the chamber and opening is approximately the same as the width of the central perforated portion of the conveyor band. The length of the opening, i.e., the dimension perpendicular to the plane of FIGURE 3, is approximately the length of one cigarette.

A flexible pipe 72, FIGURE 3, communicating with the interior of the chamber or cell 70, extends into a conduit 19. The conduit 19 is the main air exhaust duct for the suction chamber 18. Consequently, air is drawn through the conveyor band 1, the small chamber 70, and the pipe 72, independently of the flow of air through the conveyor and suction chamber 18 elsewhere along the conveyor.

A further pipe 74, FIGURES 2 and 3, extends from the chamber or air cell 70 to a bellows constituted by a pile or stack of flexible air capsules 75, FIGURES 2, 7, 12 and 14, with which it communicates so that the air pressure within the capsules 75 corresponds to that within the chamber 70. The capsules 75 constitute a proportional control device because they respond in a manner proportional to the air pressure changes applied to them. A pipe 130 extends from the pipe 74 to a further bellows constituted by a pile or stack of flexible capsules 131. A flow restrictor 132 (FIGURE 7) is provided in the pipe 130 so that the air pressure variations within the capsules 131 are smoothed as compared with the pressure variations in the chamber 70, and thus the capsules 131 constitute an integral control device. The relative dimensions of the pipe 74 the throat of the restrictor 132 and the volume of the bellows 131 will determine the time constant for the integral control.

The lower walls of the lowermost capsules of the bellows 75 and 131 have fixed to them short rods 77 and 76 respectively (FIGURE 7) which are pivotally connected to opposite ends of a lever 133. A link 134 from lever 133 is pivoted to a lever 78 which is itself pivoted at 79. The bellows 75 and 131 expand and contract in response to changes in the air pressure in the capsules, and the lever 78 is accordingly turned in one direction or the other about its pivot 79. A further lever 135 is pivoted at 136 to stationary structure and at 137 to the lever 133 to restrain lengthwise movement of the lever 133.

Figure 7:
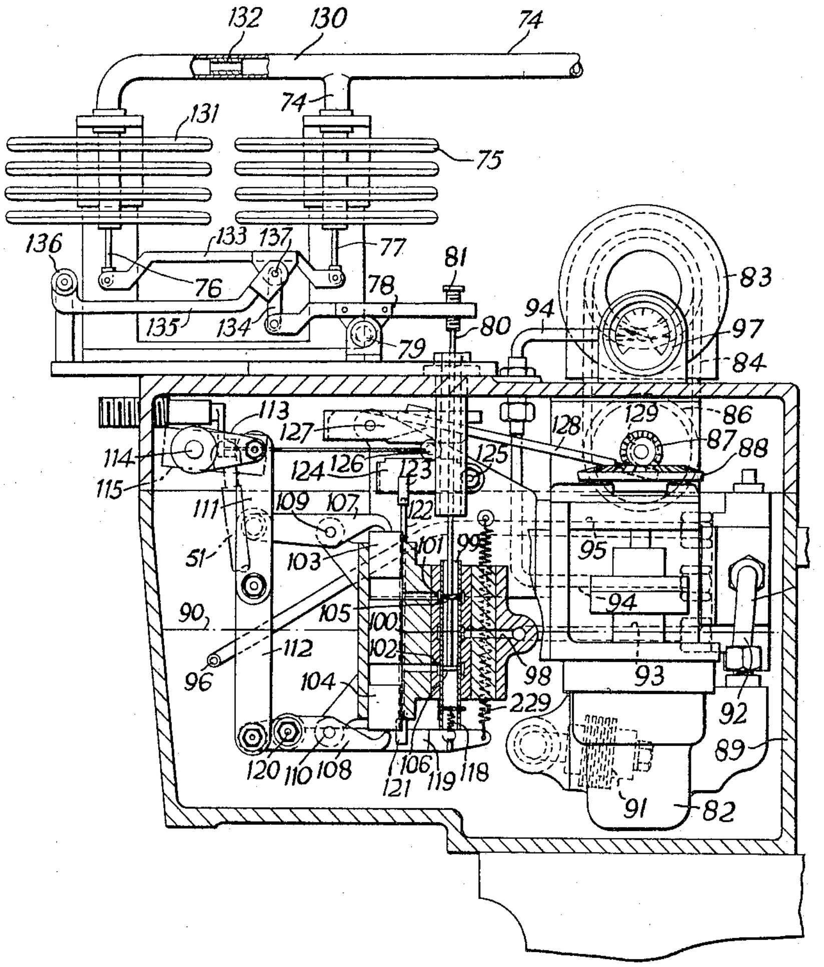
FIGURE 7 is a sectional elevation of a hydraulic amplifying device.
Figures 11, 12:
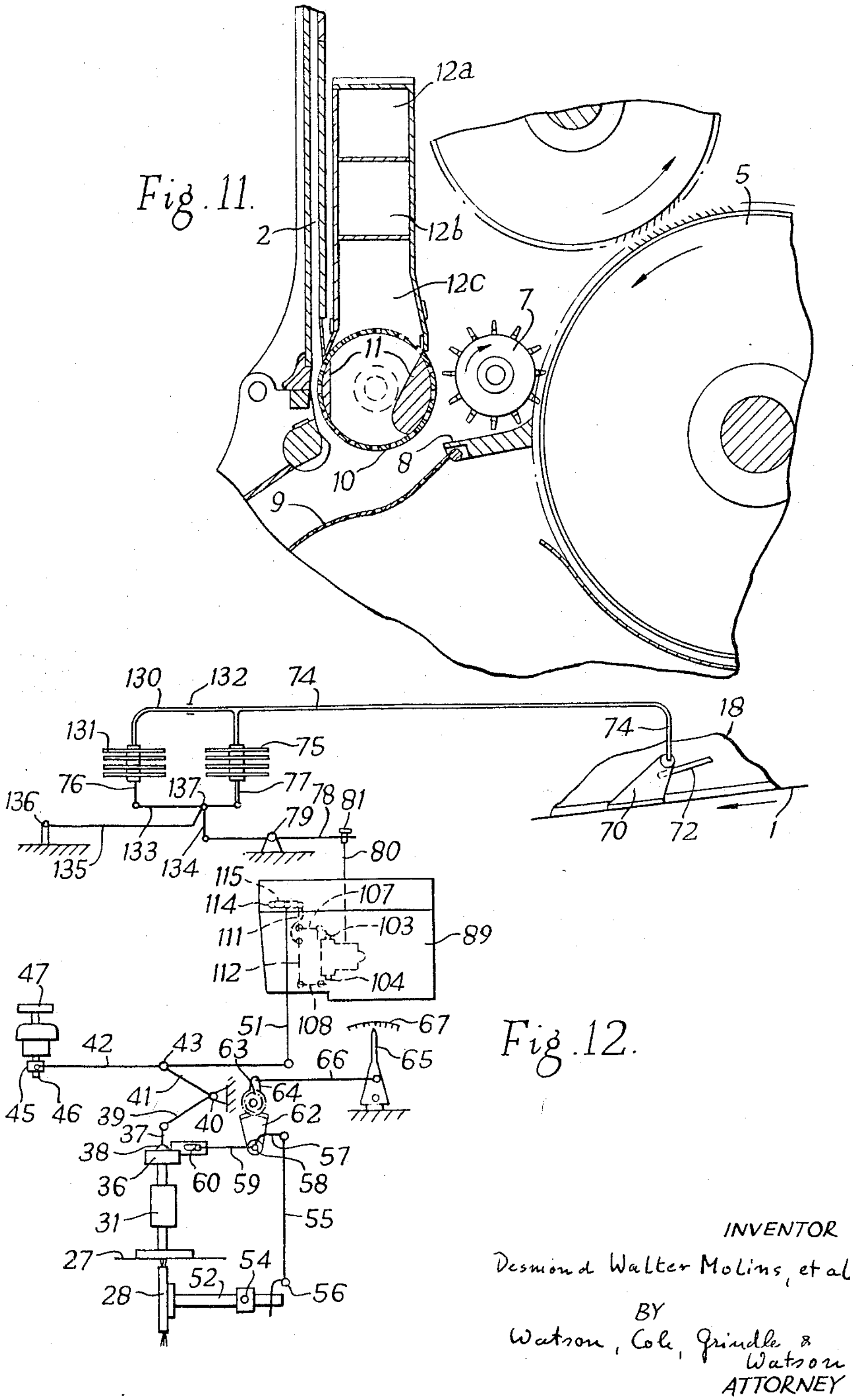
FIGURE 11 is a section on the line XI—XI of FIGURE 2 in enlarged scale showing air flow ducts.
FIGURE 12 is a schematic drawing illustrating the operation of the control linkage used in the embodiment of the invention shown in FIGURES 2 and 7.
Figure 14:
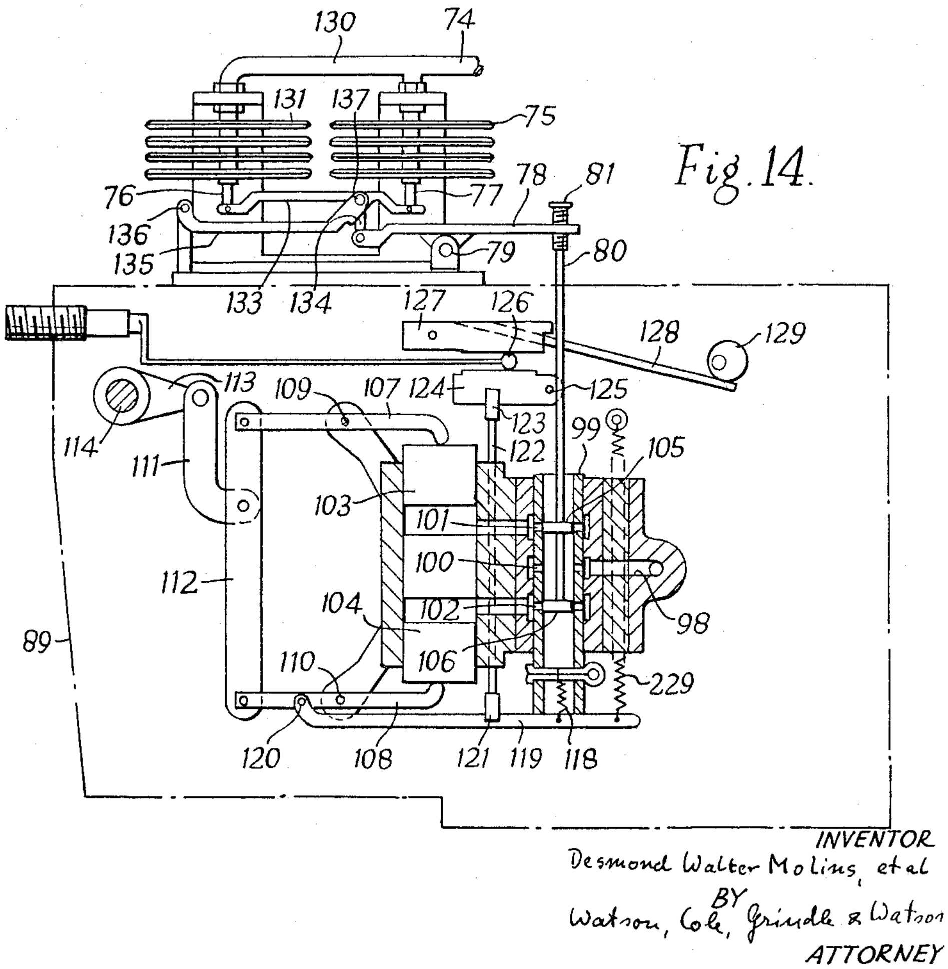

As shown in FIGURES 7, 12 and 14, movement of the free end of the lever 78 is transmitted to a rod 80 by a screw 81 threaded through the lever and secured to the upper end of the rod. This rod forms part of the input valve 105, 106 of a hydraulic amplifier to be described later, by which small movements of the rod are translated to a piston device 103, 104, which is capable of applying sufficient force to effect lengthwise movement of the rod 51, FIGURES 2, 4, 5, and 7, and thereby raise or lower one end of the lever 42, FIGURES 2, 4 and 5, from which the trimming discs 27 are supported. Accordingly, the right hand end of the lever 42 as seen in FIGURE 4 is moved in accordance with variations in the air pressure existing within the chamber 70, since this pressure is transmitted to the capsules 75 and 131 which control the movements of the input valve.

As the tobacco filler moves past the chamber 70 the air pressure in the chamber will fluctuate according to variations in air permeability of the filler as the filler passes beneath the chamber or, in other words, in accordance with variations in the resistance offered by the filler to the flow of air through and across the filler, transversely of its length, into the chamber 70. These differences in resistance are, in general, due to differences in the density of tobacco contained in the filler at different portions along its length. As explained above, the filler is held on the conveyor band 1 by suction. This suction is sufficiently strong to compress the filler transversely to a considerable degree—for example, it may be compressed to a density substantially two-thirds of the density required in the tobacco contained in the cigarettes which are being produced.

The density to which the filler is compressed by suction will, however, depend to some extent on the quantity of tobacco contained in any particular portion along the length of the filler. That is to say, portions containing more tobacco will be more compressed and densified by the suction than will portions containing less tobacco. Accordingly the trimming device is operated in such a way as to reduce the filler to a smaller size at those positions where the untrimmed filler is denser and contains more tobacco, than at those positions at which the filler is less dense and contains less tobacco.

It is found that a typical value of the correlation coefficient ($r$) between the pressure drop and the corresponding density of the tobacco filler at the point where the air passes through is 0.8.

As pointed out above, the resistance offered by the untrimmed filler to the flow of air through it varies according to the quantity of tobacco present in the filler stream and the density of the filler stream. Thus, the resistance is greater when more tobacco is present, and smaller when less tobacco is present. Accordingly, the air pressure in the chamber 70 will be lowest and the pressure drop across the tobacco filler will be greatest when the greatest quantity of tobacco per unit length of the filler passes the chamber 70, and vice versa. When the pressure in the chamber 70 falls, the hydraulic amplifier is actuated in such a way that the lever 42, and hence the trimming discs 27, are raised. Thus, the trimming discs are brought closer to the conveyor band 1 and trim the filler to a smaller cross-sectional size. When, on the other hand, the pressure in the chamber 70 rises, due to the fact that less tobacco is passing the chamber, the discs 27 are lowered. Thus, the discs are moved away from the conveyor band 1 and trim the filler to a larger cross-sectional area than before. In either case the direction and extent of movement of the discs will depend on the pressure existing in the chamber 70.

The hydraulic amplifying unit, FIGURE 7, comprises an oil pump 82 driven by a motor 83 through a belt 84 which drives a pulley 86 to which is fixed a bevel gear wheel 87 engaging a further bevel gear wheel 88. The unit is contained within a casing 89 which is partially filled with oil, the oil level being indicated by the dot and dash line 90. Oil is drawn into the pump through a filter 91 and is discharged through a pipe 92 communicating with three pipes 93, 94 and 95. The pipe 95 is a return pipe having an outlet 96, and the pipe 94 extends to a pressure gauge 97. The pipe 93 feeds oil by way of a conduit 98 to the interior of a slidable sleeve 99 having a central port 100 to admit oil. The sleeve is also provided with spaced ports 101 and 102 through which oil can be admitted to a piston device comprising two pistons 103 and 104. FIGURE 12 represents schematically the overall operation of these pistons.

The input valve comprises two spaced valve elements 105 and 106 on the rod 80. These are spaced to correspond to the spacing of the ports 101, 102, and in the position shown in FIGURE 7 they cover both those ports and thus prevent any flow of oil to the pistons 103 or 104. Lengthwise movement of the rod 80, however, causes either the port 101 or the port 102 to be uncovered so as to admit oil, and as explained above, such movements of the rod 80 are effected in response to changes in air pressure in the air cell 70.

The pistons 103, 104, engage arms 107, 108, pivoted at 109 and 110 respectively. These arms are pivotally connected to a link formed in two parts 111 and 112, the part 111 being pivoted on the end of a crank lever 113 fixed on a shaft 114. A short lever 115 is connected at one end thereof to the upper end of the rod 51, the other end of the lever 115 being fixed on the shaft 114 and spaced thereon from the crank lever 113. Thus, rocking of the shaft 114 effects upward or downward movement of the rod 51. An indicator needle 116, FIGURE 2, is also fixed on the shaft 114 and is arranged to swing over a scale 117, thus giving a visual indication of variations in pressure in the chamber or cell 70.

Figure 13:
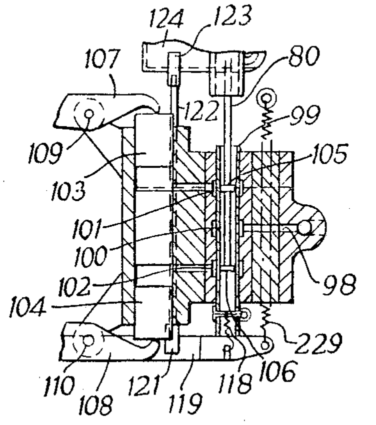
FIGURE 13 is an enlarged segment of a portion of the mechanism shown in FIGURE 7; and, FIGURE 14 is a simplified elevational view with parts shown in section of a portion of FIGURE 7 showing the hydraulic controls contained therein.

Referring again to FIGURES 7 and 14, the sleeve 99 is arranged to follow the movements of the rod 80, in order to bring the hydraulic pressure loads on the pistons into balance when the pistons have moved a predetermined distance, by bringing the port 101 or 102, which has been opened by movement of the rod, again into register with the valve elements 105 or 106. For this purpose the sleeve 99 is connected by a spring 118 to an arm 119 pivotally connected at 120 to the arm 108. The arm 119 is arranged to pivot about a member 121 referred to later. Thus, if for example, the rod 80 moves downwardly from the position shown in FIGURE 7 (due to reduction of pressure in the chamber 70 and capsules 75), the port 102 in the sleeve 99 will be uncovered and will admit oil to the piston 104 which will move downwardly, turning the arm 108 about its pivot 110. In consequence, the left-hand end of the lever 119, as viewed in FIGURE 7 and as shown in simplifier form in FIGURES 13 and 14, moves upwardly about the pivot 121, and the right-hand end moves downwardly pulling with it the sleeve 99 so as to bring the port 102 again into register with the valve element 106. The downward movement of the piston causes the shaft 114 to rock counterclockwise, FIGURES 2 and 7, thereby raising the rod 51 and the right-hand end of the lever 42.

In order to prevent sticking of the sleeve 99, a device is provided to impart continuous movement of small amplitude to the sleeve. This is imparted by the member 121 which is forked and fits over the arm 119, and is fitted on a rod 122 which carries a similar forked member 123 at its other end. The forked member 123 receives a lever 124 pivoted at 125. Oscillatory movement is imparted to the lever 124 through a roller 126 by a further lever 127 which is oscillated by a rod 128 to which oscillatory movement is imparted by an eccentric 129 and spring 229 which reacts through rod 122.

The arrangement described above effects up and down movement of the right-hand end of the lever 42, FIGURES 2, 4 and 5 in response to variations in air pressure in the chamber or cell 70. The left-hand end of the lever 42 as viewed in those figures can be moved up or down by manual adjustment of knurled knob 47 to provide an initial adjustment of the level of the trimming device 27.

As has been mentioned above, the opening in the air cell 70, whereby the latter communicates with atmosphere via a conveyor 1 and the tobacco filler thereon, has a dimension in the direction of travel of the tobacco filler equal to about the length of a cigarette. Thus, the air pressure at any instant in the air cell 70 depends on the resistance to the passage of air through a short length of the tobacco filler, namely about a cigarette length. The chamber or cell 70 is of small volume, as are the pipe 74 and the bellows 75, and consequently the pressure variations in bellows 75 which result in raising or lowering of the trimming discs 27 represent variations in resistance to the passage of air through the tobacco averaged over a relatively short length of filler, that is, relatively short term variations.

These variations may, in general, be considered to result from variations in the quantity of tobacco present in the filler, although other factors, such as the length of the tobacco shreds, or their condition (e.g. moisture content) may have some effect.

It is found that the correlation coefficient ($r$) (as previously defined) between values of the density of the tobacco filler ($x$) and values of the pressure drop across the filler ($y$) is less than unity, with a typical value of 0.8.

It has further been found that the value of the coupling factor $k$ for the proportional control between variations of air permeability of the filler as represented by $y$ and movement of the trimming discs 27 caused by the bellows 75 should be less than unity, the best value being equal to $$\frac{r}{\sqrt{2-r^2}}=0.68$$

in this case, to give good control of the weights of individual cigarettes. Thus, the effect of the bellows 75 in controlling the trimming device 27 is arranged to give this optimum value of the coupling ratio $k_1$. However, this means that full control of the trimming device 27 is not exercised in relation to the longer term variations of density of the tobacco filler so that, although the individual weights of consecutive cigarettes will be as closely controlled in relation to each other as is possible under the circumstances, there will be a tendency for larger slowly occurring weight variations to be present than would be the case if a coupling factor of unity had been employed.

For this reason the bellows 131 is provided in FIGURE 7 and is supplied with pressure variations from pipe 74 (and thus from the chamber 70) through the flow restrictor 132. The bellows 131 thus responds only to the longer term variations of air pressure which result in the integral control function. The coupling factor $k_2$ between the variations of pressure drop across the filler as represented by the variations in air pressure in bellows 131 and the effect of the bellows 131 in controlling the trimming device 27 is made to be $1-k_1=1-0.68=0.32$. This results in a combined full control in respect of the longer term variations of density of the filler, i.e. a coupling factor of unity, exercised when the movements of the bellows 75 and 131 are combined to control the trimming device 27.

The time constant for the proportional control should be as short as possible. Theoretically, a zero time constant is desirable so that this control is sensitive to include the shortest term variations (which will be superimposed on longer term variations) so that the proportional control will respond to all the variations. In practice, however, a time constant of about the time taken to make one cigarette length of the tobacco filler will suffice.

The time constant of the bellows 75 and chamber 70 thus is arranged to be in the order of 50 milliseconds, corresponding to one cigarette length of tobacco filler passing the chamber 70 when the cigarette-making cachine is running at a speed of 1,200 cigarettes per minute. The time constant for the integral control is chosen so that substantially all the short term variations are eliminated to produce a substantially smooth variation. In practice a value of 5 seconds is used, corresponding to 100 cigarettes on a machine operating at 1,200 cigarettes per minute. Choice of the size of the flow restrictor 132 and the capacity of the bellows 131 provides a convenient method of obtaining this second time constant.

The appropriate values of the coupling factors $k_1$ and $k_2$ are produced by appropriate selection of the pressure-response of the bellows 75 and 131 to displace respective rods 76 and 77, together with appropriate proportions of the levers 133 and 78 and selection of the amplification ratio of the hydraulic amplifier to provide a kinetic relationship between the position of the cutting knives of the trimming device 27 and the air pressure applied to the bellows.

Figure 9:
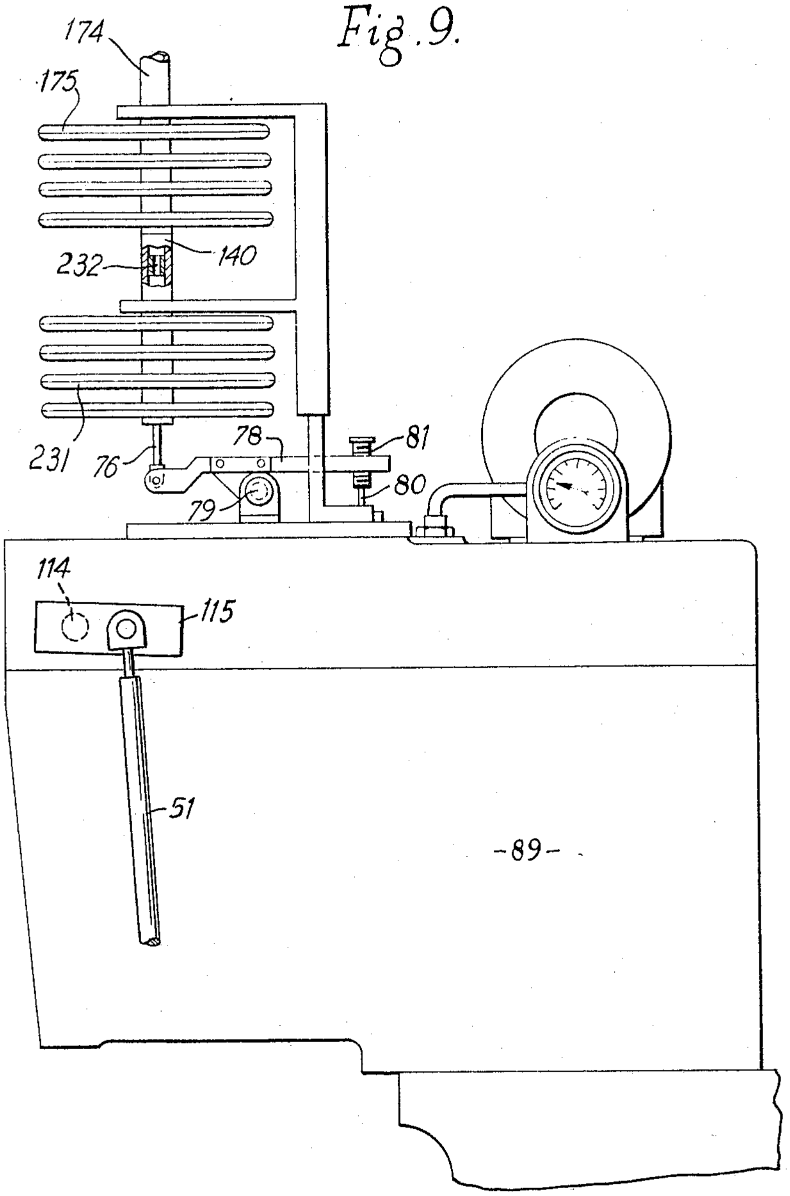
FIGURE 9 is an elevational view and shows a modification of a portion of the apparatus shown in FIGURE 7.

FIGURE 9 shows a modified arrangement corresponding to the upper part of FIGURE 7. In this arrangement a bellows 175 corresponding to the bellows 75 and a bellows 231 corresponding to the bellows 131 are connected in series with a flow restrictor 232 similar to the flow restrictor 132 positioned in a pipe 140 which connects the interiors of the two bellows and also provides a rigid mechanical connection between them. The bellows 175 communicates directly with a pipe 174 corresponding to the pipe 74 and thus is responsive to short-term variations of pressure, but as bellows 231 receives pressure variations through the restrictor 232 it again responds only to long term variations. The rod 76 is connected directly to lever 78. The rest of the apparatus is as previously described and the same time constants and coupling factors $k_1$ and $k_2$ are employed. The response time would again be in the region of 50 milliseconds.

In this arrangement the coupling factors are obtained by choice of the extent of contraction or expansion of the bellows 175 and 231 in response to a given change of pressure therein, choice of the amplification ratio of the hydraulic amplifier and choice of the length of lever 78 and choice of the position of pivot 79.

The time interval between an air pressure variation occurring in chamber 70 and a corresponding movement of the trimming discs 27, due to the pressure variation affecting the bellows 75, that is, the response time, must be such that the portion of the filler which caused that variation when it was under the chamber 70 has moved to the discs 27 i.e. the time interval must be equal to the time taken for a portion of the filler to travel from the chamber 70 to the discs 27. Part of this time interval can be chosen by selecting the length and diameter of pipe 74. A reasonable value for this response time is 50 milliseconds.

Figure 10:
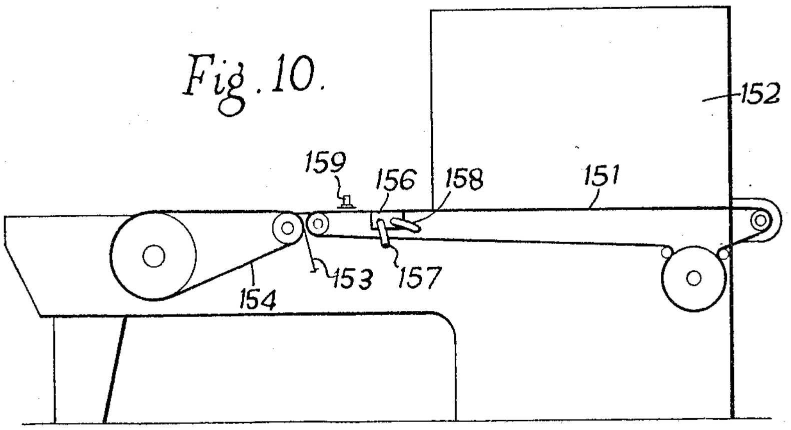
FIGURE 10 is a diagrammatic front elevation of a cigarette-making machine illustrating an alternative arrangement.

Referring now to FIGURE 10, this shows in diagrammatic form a cigarette-making machine which is in general of known type in which tobacco is showered on to a conveyor tape 151 from a hopper 152 in conventional manner so as to be supported on the tape and form a filler thereon. This filler is transferred on to a paper web 153 supported by a conveyor band 154.

In this construction the tape 151 is constructed in any suitable way so as to permit air to pass therethrough for example, it may be a perforated metal band as in the construction already described.

Just beyond the hopper 152 and immediately below the tape 151 is a chamber 156 (corresponding to the chamber 70 in FIGURES 2 and 3) from which air is drawn through a pipe 157 by a suitable fan. A further pipe 158 communicates with bellows (not shown) which may be exactly as described with reference to FIGURES 2 and 7 or 9.

A trimming device 159 is mounted above the tape 151 just beyond the chamber 156 and operates in the same manner as the device 26 in FIGURE 2, except of course that the filler is carried on the upper side instead of the underside of the conveyor tape. Devices (not shown) are provided coupling the chamber 156 to the trimming discs just as in the construction already described.

The correlation coefficient $r$ between the air permeability of the continuous tobacco filler stream and the density of the portion of the stream which is retained on the conveyor 1 after the trimming operation can be obtained as follows. The cigarette-making machine is run with the trimming device fixed to trim the tobacco stream to a constant distance from the band 1, that is, to trim the stream to a constant cross-sectional area. A trace of the pressure in chamber 70 is taken on a chart recorder. On the chart cigarette lengths are marked off and the trace is averaged over each cigarette length to give the $y$ values. Either the machine can be run with a beta ray device acting on the continuous cigarette rod made by the machine to give a trace of mass per unit length of the rod on the same or a similar chart, it being arranged that the cigarette lengths of the rod correspond to the same lengths of the stream, the trace also being averaged as for the air pressure trace to give the $x$ values, or the cigarettes produced from the rod can be weighed. In the latter case the cigarettes actually made should correspond with the cigarette lengths on the air pressure trace. A set of corresponding $x$ and $y$ values is thus obtained, and the actual obtaining of the value of $r$ from the expression for $r$ quoted previously is a straightforward computation. It will be appreciated that as the filler has been trimmed to a constant cross-sectional area the mass per unit length of the stream and thus of the cigarette rod will vary directly as the density of the stream.

What we claim as our invention and desire to secure by Letters Patent is:

1. In a continuous rod cigarette-making machine having means for forming an elongated continuous filler stream containing tobacco in excess of that required in the cigarette rod and having at least some variations in density and in mass per unit length therealong, conveyor means for conveying the filler stream lengthwise toward cigarette rod-forming devices, a trimmer located along said filler stream to remove excess tobacco therefrom, means for adjustably supporting said trimmer for movement toward and away from said conveyor to vary the cross-sectional area of the stream to compensate for variations in the density of the stream before trimming, means upstream of said trimmer for passing air generally transversely through said stream, and pneumatic detection means responsive to the air passing through said stream to detect variations, both long-term and short-term, in the air permeability of the tobacco in said stream and to produce a composite signal varying therewith, said air permeability variations having a correlation with and providing an indication of the density variations in said untrimmed stream, the improvement of a control system for said trimmer supporting means, said system comprising a first control means for receiving said composite signal from said detection means and for producing an output indication responsive to the composite signal, additional means for receiving the composite signal and for smoothing the same to minimize the short-term variations and leave longer-term variations therein, a second control means for receiving the smoothed signal and producing an output indication responsive to the smoothed signal, and coupling means for receiving said output indications from both said control means, combining said output indications and transmitting the same to said trimmer supporting means to impart to said trimmer a displacement varying with the combined output indications of both said control means.

2. A continuous rod cigarette machine as defined in claim 1 in which said coupling means imparts to said trimmer a displacement of which the component due to the response of said first control means is equal to $$\sqrt{2-r^2}$$

where $r$ is a correlation coefficient $$\frac{\sum(x-\bar{x})(y-\bar{y})}{\sqrt{\sum(x-\bar{x})^2\sum(y-\bar{y})^2}}$$

where $x$ represents the short-term values of the density of the tobacco filler, $\bar{x}$ is the arithmetic means of the $x$ values, $y$ represents corresponding values of the air permeability of the filler and $\bar{y}$ is the arithmetic means of the $y$ values.

3. A continuous rod cigarette machine as defined in claim 1 wherein said detector means comprises means defining a chamber in communication with the means for passing air through said filler stream, so that variations in pressure drop of the airflow through the filler stream caused by variations in air permeability of the filler stream produce corresponding variations in air pressure in the chamber, and said first control means comprises a first bellows, connected directly to said chamber, said second control means comprises a second bellows, and said signal smoothing means comprises a conduit having a restricted passage between said chamber and said second bellows, whereby displacement of said first bellows varies with short-term variations in air permeability of said filler stream and displacement of said second bellows varies with longer-term variations in air permeability of said filler stream.

4. A continuous rod cigarette machine as defined in claim 2, wherein said detection means comprises means defining a chamber in communication with said air passing means so that variations in pressure drop of the airflow through the filler stream caused by variations in air permeability of the filler stream produce corresponding variations in air pressure in the chamber, said first control means comprises a first bellows connected directly to said chamber, said second control means comprises a second bellows, said signal smoothing means comprises a conduit having a restricted passage between said chamber and said second bellows, whereby displacement of said first bellows varies with short-term variations in air permeability of said filler stream and displacement of said second bellows varies with longer-term variations in air permeability of said filler stream, and said coupling means comprises a lever having a pivot point intermediate the ends thereof and connected at opposite ends thereof to the said two bellows so that the expansions of the bellows move the lever bodily in one direction and the contractions of the bellows move the lever bodily in an opposite direction, and displacement amplifying means connecting the pivot point of said lever to said trimmer, the ratio of the distance from said pivot point to the point of connection on said lever with said second bellows relative to the overall length of the lever being selected to equal the ratio of said component relative to unity.

References Cited by the Examiner

UNITED STATES PATENTS

| | | | |
|---|---|---|---|
| 1,808,794 | 6/1931 | Stelzer | 131—110 |
| 1,879,016 | 9/1932 | Austin. | |
| 2,516,932 | 8/1950 | Wainright. | |
| 2,832,352 | 4/1958 | Powell | 131—21 |
| 2,938,521 | 5/1960 | Lanore | 131—21 |
| 3,089,497 | 5/1963 | Molins et al. | 131—21 |

FOREIGN PATENTS

| | | |
|---|---|---|
| 612,137 | 1/1961 | Canada. |
| 1,179,992 | 12/1958 | France. |
| 385,946 | 2/1933 | Great Britain. |
| 854,737 | 11/1960 | Great Britain. |

SAMUEL KOREN, *Primary Examiner.*

JOSEPH S. REICH, *Examiner.*